(12) United States Patent
Hamada

(10) Patent No.: US 7,693,391 B2
(45) Date of Patent: Apr. 6, 2010

(54) VIDEO PLAYBACK DEVICE, PLAYBACK METHOD AND VIDEO PLAYBACK PROGRAM

(75) Inventor: Mitsuru Hamada, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 741 days.

(21) Appl. No.: 10/564,621

(22) PCT Filed: Mar. 18, 2005

(86) PCT No.: PCT/JP2005/005617

§ 371 (c)(1),
(2), (4) Date: Aug. 7, 2006

(87) PCT Pub. No.: WO2005/091295

PCT Pub. Date: Sep. 29, 2005

(65) Prior Publication Data

US 2007/0053657 A1   Mar. 8, 2007

(30) Foreign Application Priority Data

Mar. 18, 2004 (JP) .............................. 2004-077951

(51) Int. Cl.
*H04N 5/76* (2006.01)
*H04N 7/00* (2006.01)
*H04N 5/00* (2006.01)

(52) U.S. Cl. .......................................... 386/46; 386/117
(58) Field of Classification Search ...................... 386/1, 386/45–46, 117, 83, 95–96, 125–126
See application file for complete search history.

(56) References Cited

U.S. PATENT DOCUMENTS 6,731,952 B2 * 5/2004 Schaeffer et al. ............ 455/557

(Continued)

FOREIGN PATENT DOCUMENTS

EP   1 189 437 A   3/2002

(Continued)

OTHER PUBLICATIONS

Japanese Office Action dated Dec. 21, 2007 (3 pages), and English translation thereof (3 pages), issued in counterpart Japanese Application Serial No. 2004-077951.

(Continued)

*Primary Examiner*—Thai Tran
*Assistant Examiner*—Nigar Chowdhury
(74) *Attorney, Agent, or Firm*—Frishauf, Holtz, Goodman & Chick, P.C.

(57) ABSTRACT

When an album mode is selected by a predetermined operation, thumbnail image data is acquired corresponding to saved video files which are retrieved from a thumbnail image data storage area (1495) and a list display of the thumbnail images is shown in the main display section (102) based on the thumbnail image data of each video file. When one of the thumbnail images is selected by the user, the operation judges whether or not the playback time for a video file of a selected thumbnail image is longer than a predetermined playback time. If shorter than a predetermined playback time, a normal playback is performed in the display position of the thumbnail image during which the thumbnail image scale-size is reduced.

13 Claims, 13 Drawing Sheets

U.S. PATENT DOCUMENTS

| | | |
|---|---|---|
| 6,967,675 B1 | 11/2005 | Ito et al. |
| 7,319,480 B2 * | 1/2008 | Akiyama et al. ......... 348/220.1 |
| 7,408,581 B2 | 8/2008 | Gohda |
| 2001/0056434 A1 | 12/2001 | Kaplan et al. |
| 2002/0059584 A1 | 5/2002 | Ferman et al. |
| 2003/0234805 A1 | 12/2003 | Toyama et al. |
| 2004/0001696 A1 | 1/2004 | Kogusuri |

FOREIGN PATENT DOCUMENTS

| | | |
|---|---|---|
| EP | 1 377 047 A | 1/2004 |
| JP | 10-322627 A | 4/1998 |
| JP | 2000-076463 A | 3/2000 |
| JP | 2001-197429 A | 7/2001 |
| JP | 2002-305713 A | 10/2002 |
| JP | 2004-032535 A | 1/2004 |
| JP | 2004-032636 A | 1/2004 |
| WO | WO 01/82624 A | 11/2001 |

OTHER PUBLICATIONS

Japanese Office Action dated Oct. 31, 2008 (3 pages), and English translation thereof (4 pages), issued in counterpart Japanese Application Serial No. 2004-077951.

Japanese Office Action dated Apr. 15, 2009 (3 pages), and English translation thereof (3 pages), issued in counterpart Japanese Application Serial No. 2004-077951.

* cited by examiner

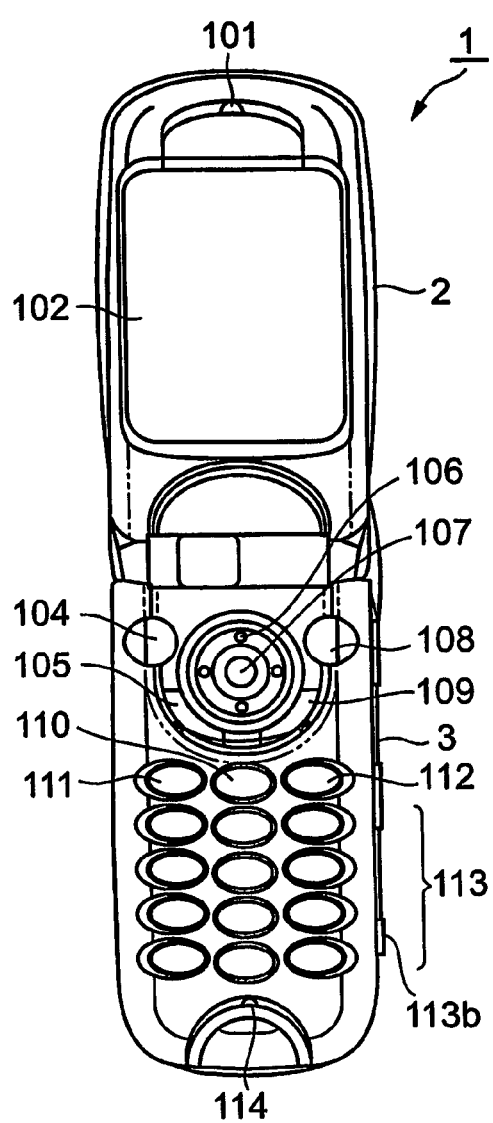
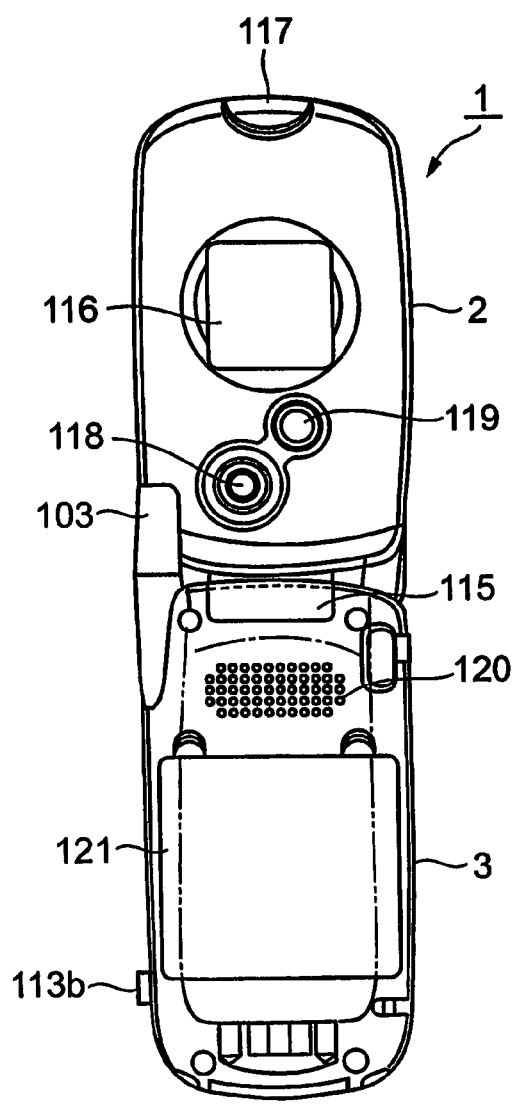
FIG. 1A
FIG. 1B

| ITEMS | DETAILS |
|---|---|
| PROTOCOL PROGRAM | COMMUNICATION DRIVER |
| NONVOLATILE SETUP DATA | COMMUNICATION SETTING AREA |

| ITEMS | DETAILS |
|---|---|
| WORK AREA | COMMUNICATION DRIVER |
| OTHER | COMMUNICATION WORK AREA |

| ITEMS | DETAILS |
|---|---|
| WORK AREA | APPLICATION HEAP |
| | JAVA |
| BACKUP | RAM USER DATA |
| SYSTEM MANAGEMENT | FILE SYSTEM |
| CACHE MEMORY | BROWSER CACHE MEMORY |
| OTHER | |

| ITEMS | DETAILS |
|---|---|
| DATA AREA | IMAGES · ILLUSTRATIONS · FONTS MELODIES · ICON DATA CAMERA DATA (FRAME, STAMP) |
| FILE SYSTEM | USER DATA   MANAGEMENT DATA FILE SYSTEM MANAGEMENT DATA |
| DICTIONARY | DATA |
| | PROGRAM |
| UI PROGRAM | UI RELATED, JAVA |

| RECORD NUMBER | FILE NAME | ACQUISITION DEVICE | PROFILE DATA | STORED ADDRESS OF ACTUAL FILE | STORED ADDRESS OF THUMBNAIL DATA |
|---|---|---|---|---|---|
| 0001 | abc.3g2 | Inner camera device | .... | xx0012ab | xx23abcd |
| 0002 | def.3gp | Appended E-mail | .... | x101dfea | x103efab |
| 0003 | MOL001.ASF | Directy Input from audio/visual device | .... | 1100ffff | 11ab0123 |
| 0004 | ghi.mpeg | Record Digital Video Broadcast Contents | .... | 1a00deda | 2d00efac |

FADE EFFECT

THUMBNAIL IMAGE CREATED WITH THE LEAD FRAME

THUMBNAIL IMAGE CREATED WITH AN INTERMEDIATE FRAME

VIDEO PLAYBACK DEVICE, PLAYBACK METHOD AND VIDEO PLAYBACK PROGRAM

This application is a U.S. National Phase Application under 35 USC 371 of International Application PCT/JP2005/005617 filed Mar. 18, 2005.

CROSS-REFERENCE TO RELATED APPLICATION

This application is based upon and claims the benefit of priority from the prior Japanese Patent Application No. 2004-077951, filed Mar. 18, 2004, the entire contents of which is incorporated herein by reference.

TECHNICAL FIELD

The present invention relates to a video playback device, video playback method and video playback program.

BACKGROUND ART

In recent years, multi-function digital cameras or cellular phones (also commonly referred to as mobile-phones) capable of recording still images and comprised with a video recording function are becoming prevalent in the digital photography marketplace. As a means to visually locate still images, these digital cameras or cellular phones commonly include a thumbnail display mode feature which is provided to show a plurality of reduced images on one display screen. For example, in the case video as disclosed in Japanese Laid-Open Patent Application No. 2000-278641 titled "DEVICE AND METHOD FOR PROCESSING MOVING PICTURE," the beginning image (lead frame) of each of a plurality of videos is used for displaying thumbnails as still images.

However, in a conventional digital camera or cellular phone, and more particularly in a cellular phone, simultaneous playback of a plurality of videos cannot be performed all at once. Also, in a cellular phone, the first screen (lead frame) is displayed as still images. Afterwards, if the beginning is the same image as a video of a different image, the actual contents are not understood only by a thumbnail display. For this reason, in order to check the subject matter of each video, a playback procedure has to be executed for each video. Thus, this is a troublesome process.

DISCLOSURE OF THE INVENTION

The purpose of the present invention is to provide a video playback device, video playback method and video playback program which can readily identify the content (subject matter) of videos.

To achieve the above-mentioned object of the present invention, a video playback device comprises the following configuration of a video storage means for storing a plurality of videos; a thumbnail image generation means for generating thumbnail images from the videos and for generating thumbnail images; a thumbnail image storage means for storing thumbnail images of the videos and correspondingly appending plural sets generated in the thumbnail image generation means; a display means for performing a list display of thumbnail images for plural sets stored in the thumbnail image storage means; a selection means for selecting any one of a plurality of thumbnail images displayed in the display means; and a playback means for reducing the size of a particular thumbnail image and replaying a video corresponding to a thumbnail image selected in the selection means in the thumbnail image display position.

Additionally, to achieve the above-mentioned object of the present invention, a video playback method comprises the following steps of a thumbnail image generation step for generating thumbnail images from a plurality of videos and for generating thumbnail images stored in a first memory; a thumbnail image storage step for storing thumbnail images of the videos and correspondingly appending plural sets generated in the thumbnail image generation step in a second memory; a display step for performing a list display of thumbnail images for plural sets stored in the thumbnail image storage step; a selection step for selecting any one of a plurality of thumbnail images displayed in the display step; and a playback step for reducing the size of a particular thumbnail image and replaying a video corresponding to the selection step in the thumbnail image display position.

Furthermore, to achieve the above-mentioned object of the present invention a video playback program is characterized by execution in a computer comprising a first memory and a second memory which includes a thumbnail generation step for generating thumbnail images from a plurality of videos and for generating thumbnail images in the first memory; a thumbnail storage step for storing thumbnail images of the videos and correspondingly appending plural sets generated in the thumbnail image generation step in a second memory; a display step for performing a list display of thumbnail images for plural sets stored in the thumbnail image storage step; a selection step for selecting any one of a plurality of thumbnail images displayed in the display step; and a playback step for reducing the size of a particular thumbnail image and replaying a video corresponding to the selection step in the thumbnail image display position.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1 shows outline views (open state: front and back views) of a camera cellular phone 1 in the first embodiment of the present invention;

FIG. 3 is a conceptual diagram showing the data structure of the system ROM 132;

FIG. 4 is a conceptual diagram showing the data structure of the RAM 133;

FIG. 5 is a conceptual diagram showing the data structure of the RAM 135;

FIG. 6 is a conceptual diagram showing the data structure of the ROM 136;

FIGS. 7A and 7B are conceptual diagrams showing the data structure of the user memory 149 in which FIG. 7A shows the memory area configuration of the entire user memory 149 and FIG. 7B shows the table configuration of the file system management area 1497;

BEST MODE FOR CARRYING OUT THE INVENTION

Figure 2:
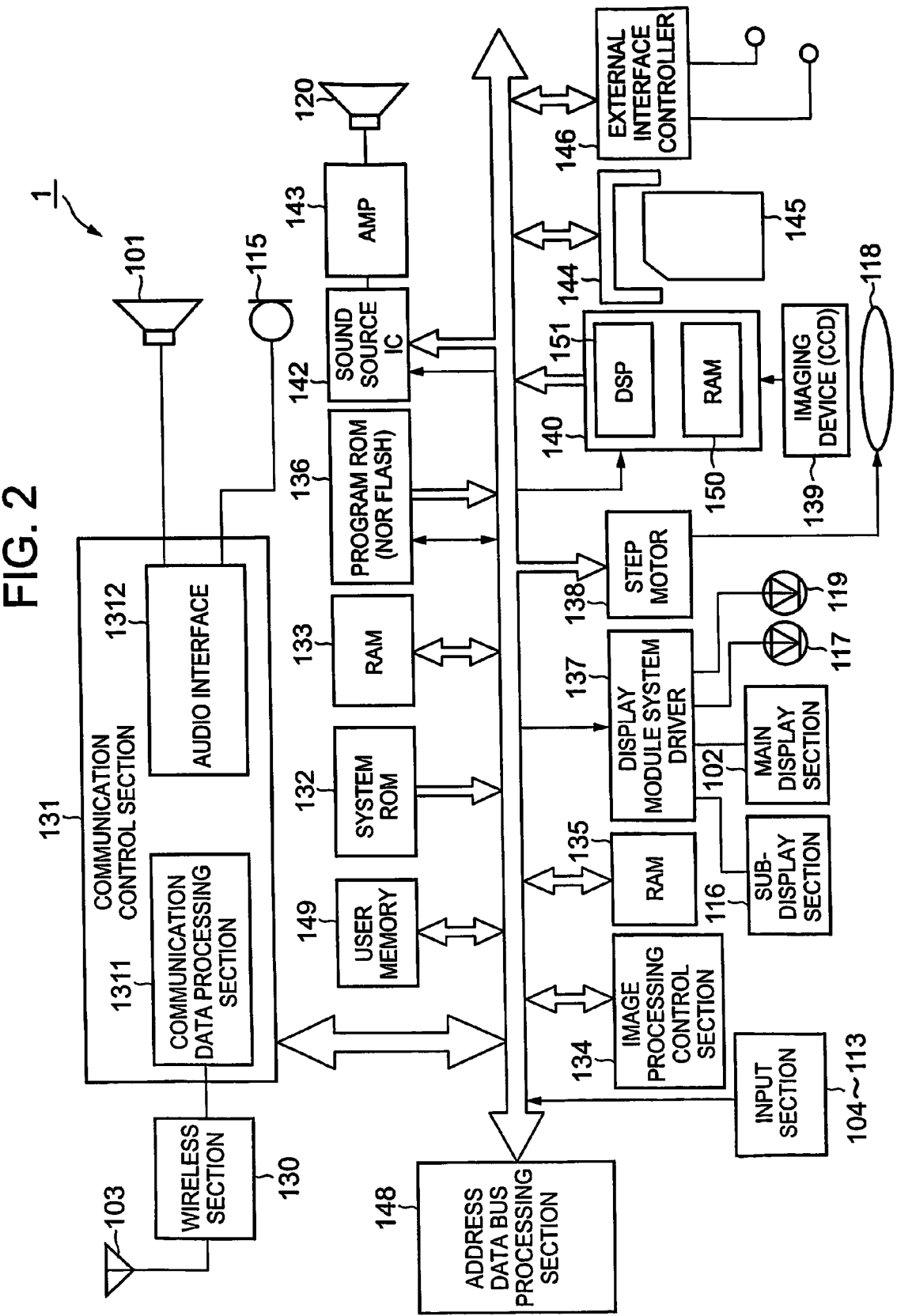
FIG. 2 is a block diagram showing the configuration of the camera cellular phone 1.

Hereinafter, the preferred embodiments of the present invention will be described in detail with reference to the drawings as applied to the embodiment of a camera cellular phone.

A. Composition of the Embodiment

FIG. 1 shows outline views (open state: front and back views) of a camera cellular phone 1 in the first embodiment of the present invention. The cellular phone 1 in the first embodiment is a double fold structure (foldable clam shell type) composed of a cover section 2 and a main body section 3. A speaker 101 is provided on the front side of the cover section 2 and performs audio output for the duration of a telephone call in the telephone mode. A display section 102 (main display section) consists of a color Liquid Crystal Display (LCD) of QVGA (Quarter Video Graphics Array) resolution having a display surface area of 320 (height)×240 (width) dot pixels. When the user operates the device normally, an image recorded in a portrait display style or a downloaded image, the video of a maximum L size (normal aspect ratio size shown at 144 dots (height)×176 dots (width)) can be displayed. Also, in the main display section 102 a video of 240 dots (height)×320 dots (width) can be displayed in a landscape display style. An antenna 103 is mounted on the back side of the main body section 3 and is retractable.

On the front of the main body section 3, a camera key 104, an E-mail key 105, a cross key 106, a decision key 107, an address key 108, an Internet connection key 109, a clear key 110, an on-hook key 111, an off-hook key 112 and a ten-key number keypad 113 are provided. In these keys, the cross key 106, the decision key 107, the address key 108 and the Internet connection key 109 are arranged in positions which can be operated by the user's right thumb when the cellular phone 1 is held in a person's right hand. Also, on the side surface of the main body section 3, a shutter key 113b is provided for initiating a video recording whenever the cover section 2 is in a closed state.

The camera key 104 is for switching the camera mode to a power "ON" state and the key for directing activation of a DSP 140 described later. The E-mail key 105 is for switching to the E-mail mode and the key to direct loading of an E-mail program. The cross key 106 is for directing movement of the cursor and movement of the focus (preference). The decision key 107 is a key for choosing mode selection, choosing options or used as a shutter key in a photography mode. The address key 108 is a key for displaying address book data. The Internet connection key 109 is a key for accessing the Internet. The clear key 110 is a key for canceling a selection, etc. The on-hook key 111 is a key used for connecting to a telephone line. The off-hook key 112 is a telephone mode/camera mode combination power "OFF" key, a power "ON" key for starting the telephone mode and a key for disconnecting from a telephone line. The ten-key number keypad 113 is used for performing character input and dialing input. A microphone 114 is mounted in the lower part of the main body section 3 and carries out the audio input for the duration of a telephone call. A card slot 115 (covered) is a slot for inserting external recording media (for example, a removable MiniSD memory card).

On the back surface of the cover section 2, a sub-display section 116 is provided and used for a date/time display, incoming telephone call notification, E-mail arrival information or as an auxiliary screen for recording still images or video recording, etc. when the cellular phone 1 is in a closed state. Also, in the camera mode the sub-display section 116 functions as a view finder for monitoring the display of images sequentially photographed with an image pick-up lens 118 described later. An LED 117 emits light for providing notification of incoming calls and E-mail arrival. An image pick-up lens 118 is used to record still images and record video. An LED 119 is for a flash function which emits light at the time of taking still images or recording video and is the light generation means for preventing underexposures. An information speaker 120 reports E-mail arrival, an emergency, etc. and in the camera mode also outputs a soft shutter button sound so that the user can hear the shutter release. A rechargeable DC battery pack 121 is also provided.

Next, FIG. 2 is a block diagram showing the configuration of the camera cellular phone 1 mentioned above. Referring to the drawing, a wireless transceiver section 130 performs communication processing including send and receive modulation/demodulation, etc. of audio or data (E-mail data), bi-phase modulation based on a Phase-Shift Keying (PSK), technique and terminal authentication processing based on a Code-Division Multiple Access (CDMA) system via the wireless antenna 103.

A communication control section 131 performs data processing suited to the communication protocols including a Code-Excited Linear Prediction (CELP) system audio encoding/decoding processing circuit, a packet data generation circuit and a packet restoration circuit. An audio interface 1312 performs input-output processing of the audio signal processed in a communication data processing section 1311. Audio inputted from the microphone 114 is converted into an audio signal and an audio signal is outputted from the speaker 101.

A system Read-Only Memory 132 (ROM) has a data structure as shown in FIG. 3 composed of a protocol program area for storing the basic operating system or protocol program for controlling overall wireless communication processing mainly and a nonvolatile setup data area for storing various data (including subscriber ID) necessary for terminal identification, etc. A Random Access Memory (RAM) 133 has a data structure as shown in FIG. 4 composed of a driver and work area relevant to communication processing. An image processing control section 134 performs overall MPEG (MPEG-4)/JPEG encoding and decoding processing relative to video/still image during recording or playback. A RAM 135 has a data structure as shown in FIG. 5 composed of a work area containing an application heap (system resource area), etc.; a backup area for storing RAM user data, etc.; a system management area for storing a file system; a browser cache memory area; and an "other" area. A program ROM 136 configured with rewriteable Flash-ROM has a data structure as shown in FIG. 6 composed of a data area for storing images, illustrations, fonts and special effects including fade effects necessary for editing recorded video files, etc.; a file system area for storing user management data or file system management data, etc.; a dictionary area for storing data, programs, etc.; and a UI program area. In particular, the control program of a DSP 151 is stored in the program ROM 136.

A display module system driver 137 includes a display buffer which drives the sub-display section 116, the main display 102, the LED 117 for information and the LED 119 for flash. A step motor 138 performs zoom control of the image pick-up lens 118. An imaging device 139 is configured with a Charged-Coupled Device (CCD) of pixels equivalent to 2,000,000 effective pixels or a CMOS which takes in an image focused by the image pick-up lens 118 as a color image, within the camera performs Analog-Digital (A/D) conversion, and outputs sequentially to a RAM 150 of a signal processing section 140. A Digital Signal Processor (DSP) 151 included in the signal processing section 140 within the camera performs clipping corresponding to a set frame rate and reads out the image data stored sequentially in the RAM 150 which is imaged with the imaging device 139 and then generates stream data. The imaging device 139 comprises the ability to capture (images) at a predetermined frame rate.

A sound source IC 142 generates a ring tone, etc. An amplifier 143 amplifies the audio signal from the sound source IC 142 and outputs from the information speaker 120. A connector 144 is for loading external recording media 145 (for example, a removable MiniSD memory card). An external interface controller 146 switches a USB interface and the interface of both 18 pin connectors, as well as controls transmission and reception of data between external equipment.

Figures 7A, 7B:
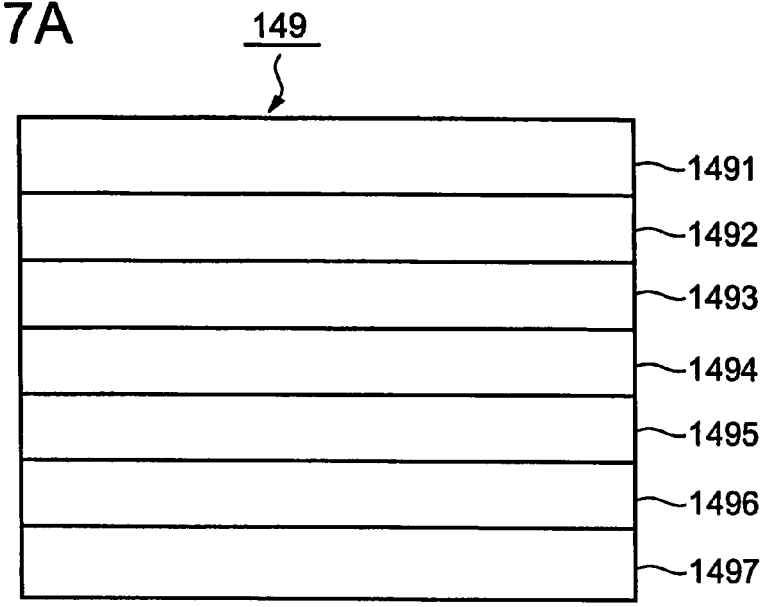

A user memory 149 has a data structure as shown in FIG. 7A composed of an E-mail data storage area 1491, an address book data storage area 1492, a data file storage area 1493, a video file storage area 1494 (first memory), a thumbnail image data storage area 1495 (second memory), a read-only area 1496 and a video file system management area 1497 (second memory). Specifically, the E-mail data storage area 1491 and the address book data storage area 1492 are self-explanatory. The data file storage area 1493 is for storing downloaded data files. The video file storage area 1494 (first memory) is for storing video files acquired via the image pick-up lens 118 and the imaging device 139 in the signal processing section 140 which undergo a digital encoding process executed in the image processing control section 134 within the camera or video files attached to E-mails, as well as video files acquired from external equipment via the external interface controller 146 or video files in which digital television signals are recorded and stored as video files. The thumbnail image data storage area 1495 (second memory) is for storing thumbnail image data created from the above-mentioned video files. The read-only area 1496 and the video file system management area 1497 (second memory) are self-explanatory.

An address data bus processing section 148 is for controlling address control of the communication control section 131 and the image processing control section 134, as well as the bus data stream.

FIG. 7B shows the details of the video file system management area 1497.

The video file system management area 1497 is composed of a record number area 1500, a file name area 1501, an acquisition device area 1502, a profile area 1503, a stored address area of particular file 1504 and a stored address area of thumbnail image data 1505. Specifically, the record number area 1500, the file name area 1501 and acquisition device area 1502 are self-explanatory. The profile area 1503 is for storing the profile of a particular file, for example, acquisition data/time, playback time, etc. The stored address area of actual files 1504 is for registering the storage address of a particular video file in the video file storage area 1494. The stored address area 1505 of thumbnail image data is for registering the storage address of thumbnail image data which is created from these video files and stored in the thumbnail image data storage area 1495. Also, these areas are correspondingly appended with record numbers for storing plural sets and performing management storage.

Furthermore, the acquisition device area 1502 registers the acquisition method pertaining to the source (origin) of these video files.

For example, the file name "abc.3g2" illustrates a video file acquired via the "inner camera device" (i.e., image pick-up lens 118, imaging device 139). This file extension "3g2" indicates the video file underwent compression encoding in the image processing control section 134.

Moreover, the file name "def.3gp" illustrates a video file "Appended E-mail" (i.e., an E-mail attachment transmitted from another cellular phone).

Also, the file name "MOL001.ASF" illustrates a video file format of "Directly input from audio-visual device" (i.e., Advanced Streaming Format inputted via the external interface controller 146 or the external recording media 145).

Further, the file name "ghi.mpeg" illustrates a video file recorded containing "Recorded Digital Video Broadcast Contents" (i.e., a video file of a recorded digital television broadcasting signal).

Based on the preferred embodiment, thumbnail image data is also generated for any video file format. In this case, if after recording and a playback display is performed to the main display 102, thumbnail image data will be generated by capturing that image (frame).

B. Operation of the Embodiment

Figure 8:
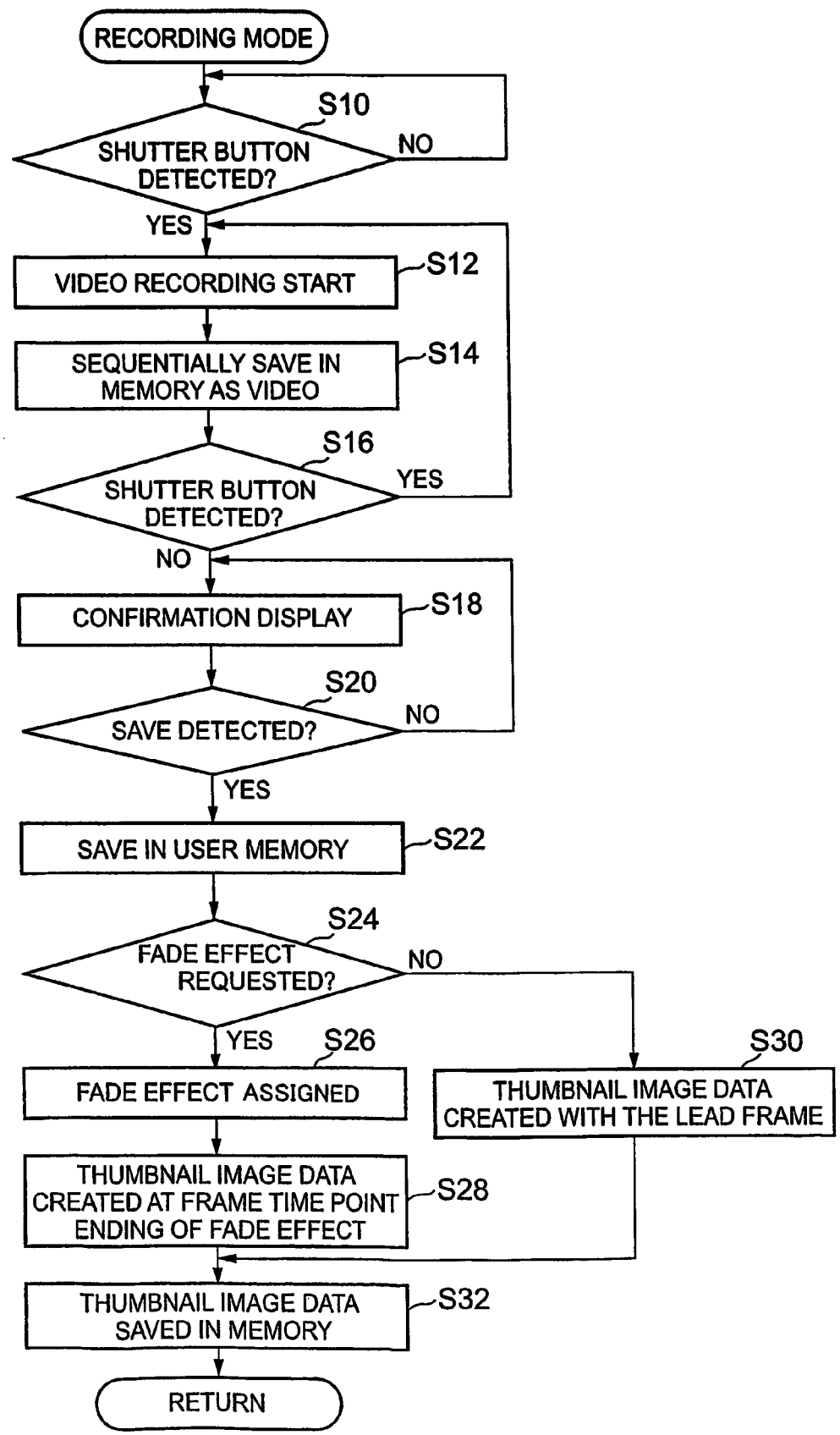
FIG. 8 is a flow chart for explaining the process of the photography mode of the camera cellular phone 1 according to the embodiment.
Figure 9:
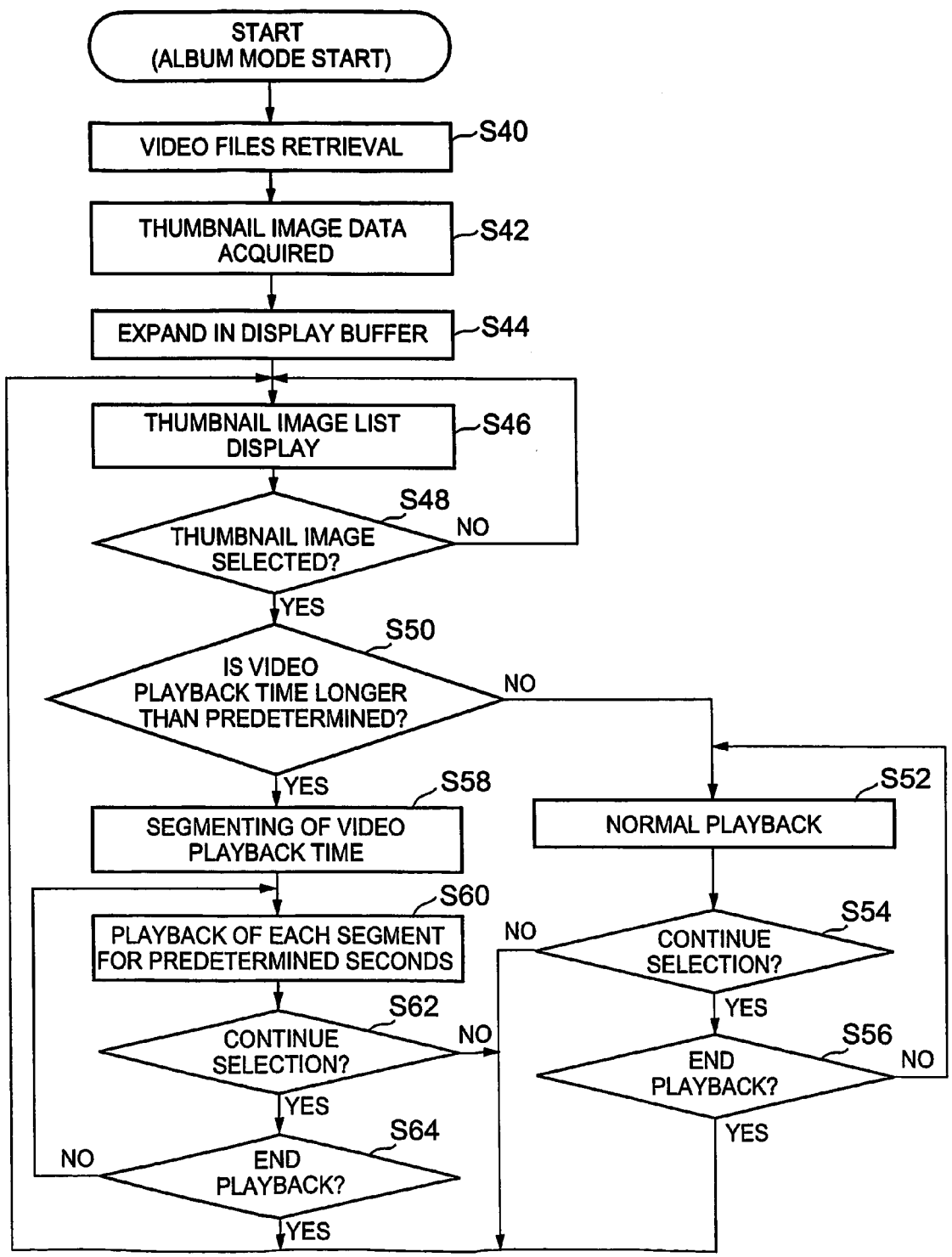
FIG. 9 is a flow chart showing the flow of processing in the album mode of the camera cellular phone 1 according to the embodiment of the embodiment.
Figure 10:
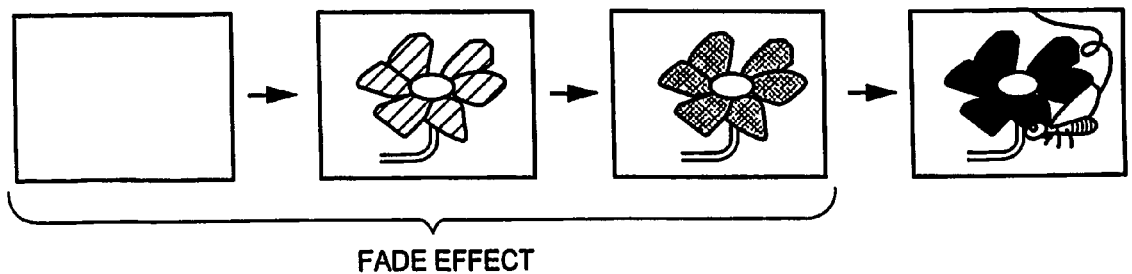
FIG. 10 is a pattern diagram showing an example of a video to which a fade effect is assigned.
Figure 11:
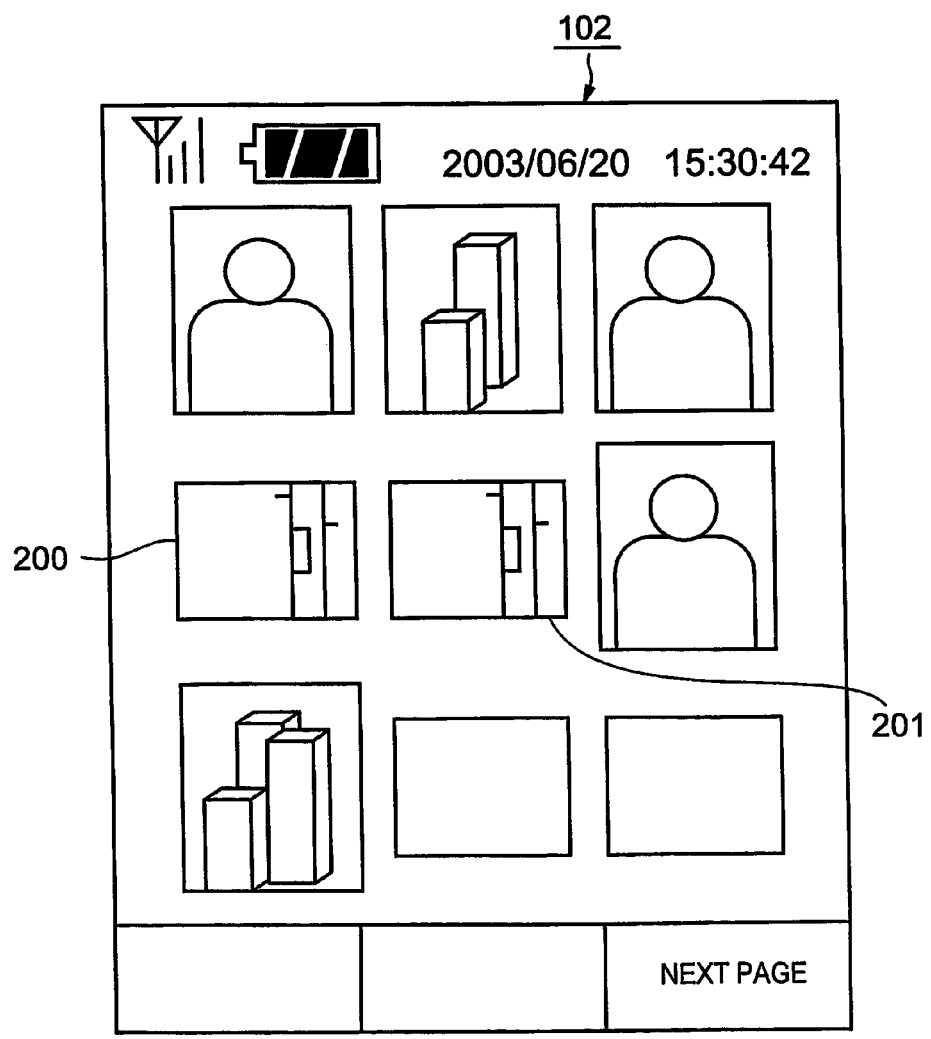
FIG. 11 is a pattern diagram showing a display example of the album mode in the camera cellular phone 1.
Figure 12:
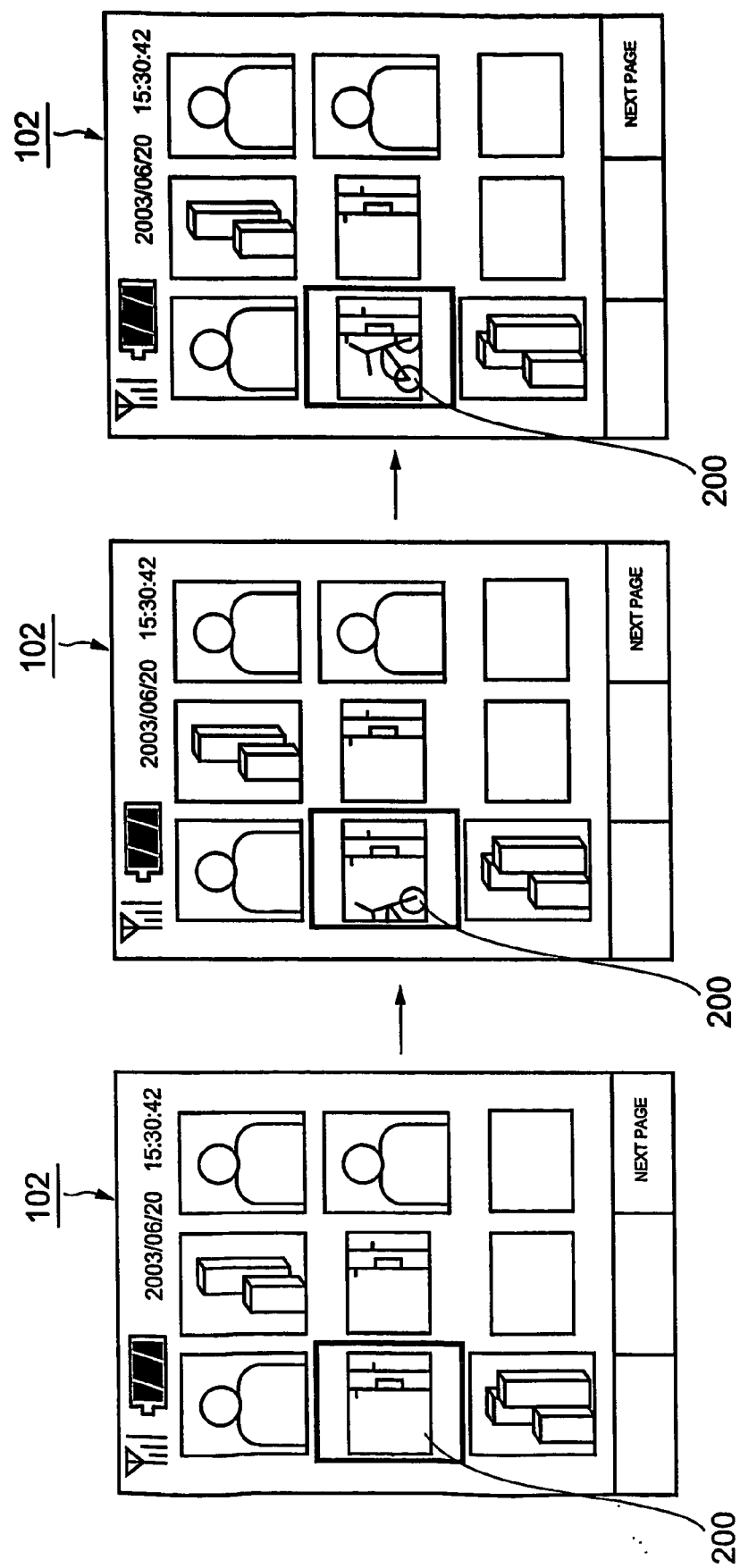
FIG. 12 is a pattern diagram showing a display example of the album mode in the camera cellular phone 1.
Figure 13:
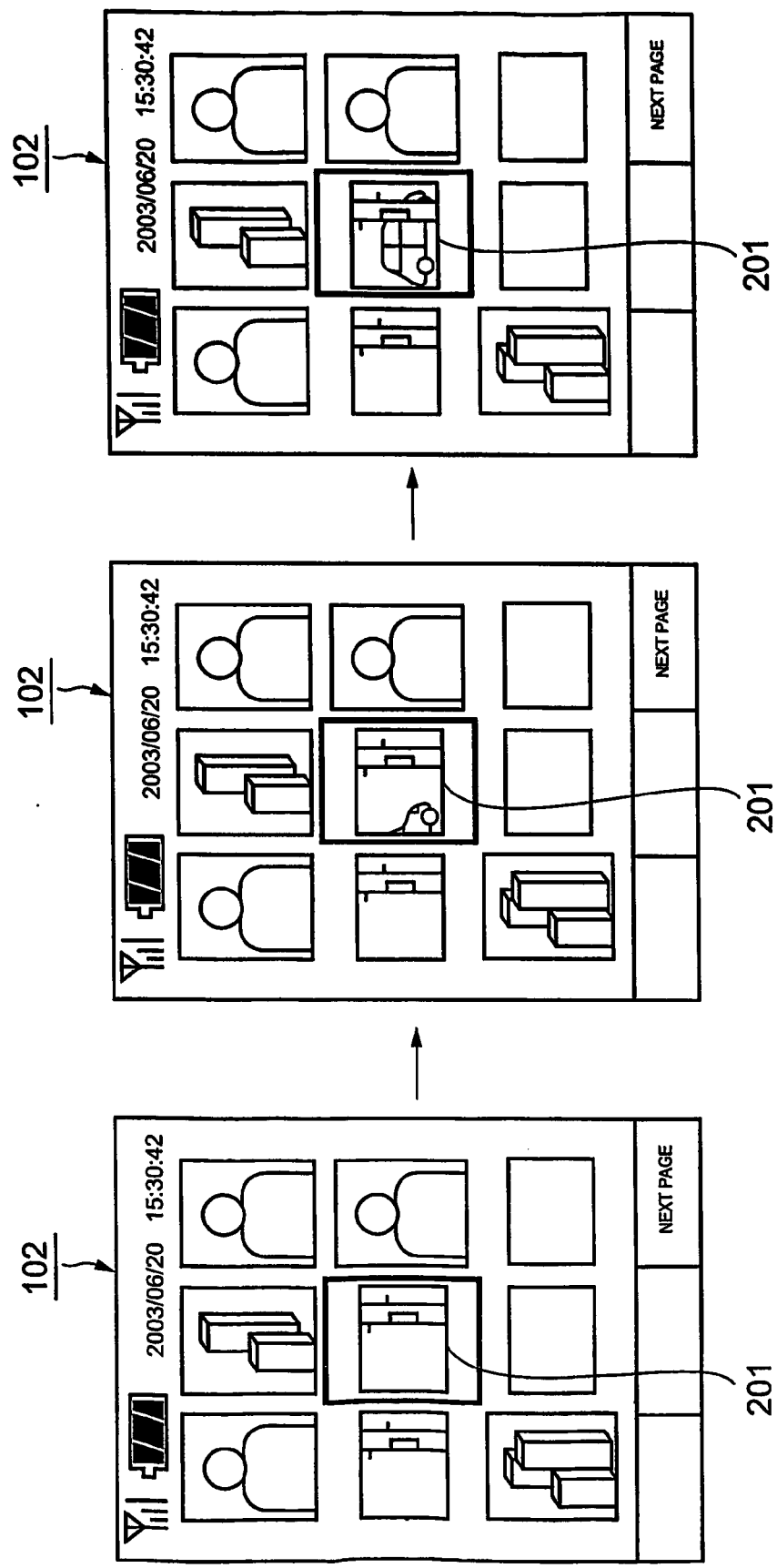
FIG. 13 is a pattern diagram showing a display example of the album mode in the camera cellular phone 1.
Figure 14:
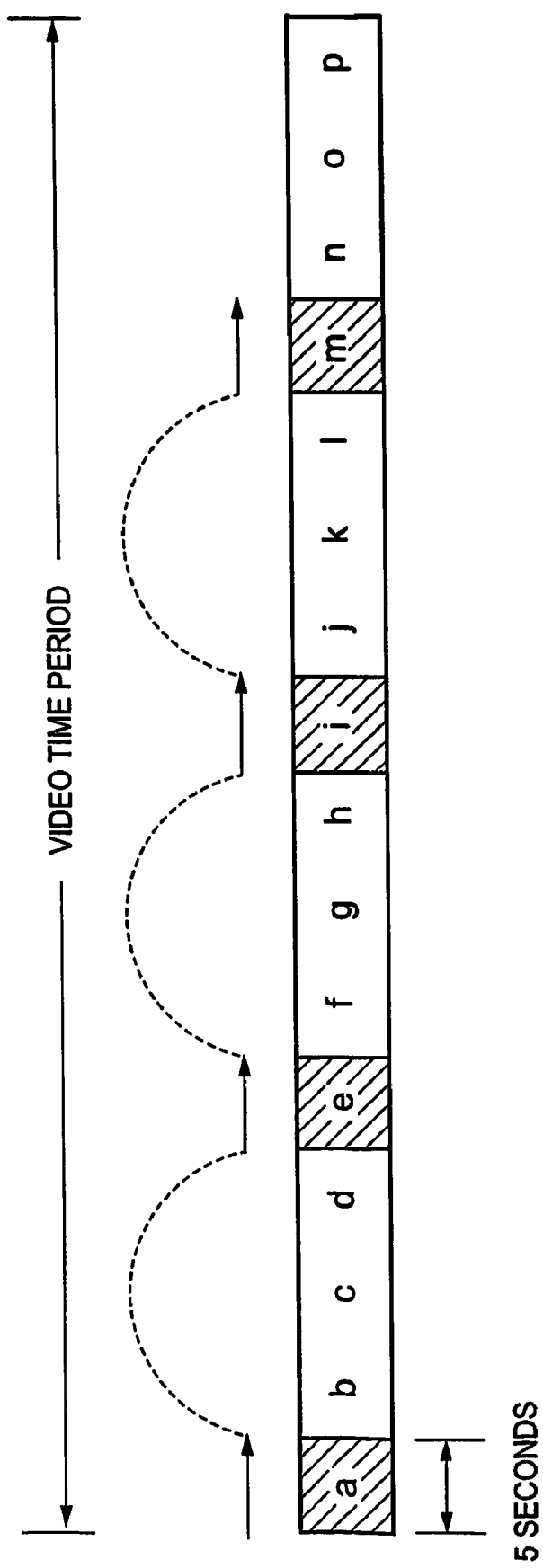
FIG. 14 is a conceptual diagram for explaining a video playback method when the video playback time is longer than a predetermined playback time.

Next, the operation of the embodiment mentioned above will be explained. FIG. 8 is a flow chart for explaining the process of the photography mode of the camera cellular phone 1 according to the embodiment. FIG. 9 is a flow chart showing the flow of processing in the album mode of the camera cellular phone 1 according to the embodiment. FIG. 10 is a pattern diagram showing an example of a video to which a fade effect is assigned. FIGS. 11 through 13 are pattern diagrams showing a display example of the album mode in the camera cellular phone 1. FIG. 14 is a conceptual diagram for explaining a video playback method when the video playback time is longer than a predetermined playback time.

B-1 Photography Mode (Movie Mode) (Synonymous with Video)

Initially, from an incoming standby status and when the movie mode is directed by user operation, a control signal is inputted to the step motor 138, the imaging device 139 and the signal processing section 140 within the camera by the image processing control section 134. This results in a through display state which displays an image on the main display 102 based on the stream data inputted through the imaging device 139, the RAM 150, the image processing control section 134 and the RAM 135. In this through display state, when "start recording" is detected by manipulation of the shutter key (decision key 107) (Step S10), an image recording is started (Step S12).

The image processing control section 134 executes an MPEG-4 format compression process of the stream data and continues storage (sequential save) to the "other" area of the RAM 135 as MPEG-4 data (Step S14). Next, the operation judges whether or not "stop recording" is detected by manipulation of the user's decision key 107 again (Step S16). Then, if manipulation of the decision key 107 is not detected, the image recording process continues from Step S12. Conversely, when manipulation of the decision key 107 is detected, the operation judges as "terminate recording" and determines whether or not to "SAVE" from the through display state by displaying a confirmation message to the user on the main display 102 (Step S18), as well judges the "YES or NO" detection of "SAVE" instructions (Step S20). If "SAVE" instructions are not acknowledged, the operation returns to a confirmation display state and when detecting an appropriate "NO" process will erase the memory content of the RAM 135. When "SAVE" instructions are detected, the video file of MPEG-4 data stored in the RAM 135 is then transferred and stored in the video file storage area 1494 of the user memory 149 and one record is appended to the video file system management area 1497 (Step S22).

Next, the operation judges whether or not a fade effect is assigned as a special effect to that saved video file (Step S24). Also, as for a fade effect, the image effect gradually transitions the lead frame of the video file from a predetermined single color frame (for example, solid black). Then, when an instruction operation which assigns a fade effect is detected from the user, the fade effect is assigned to optional frames in the saved video file from the data area of the RAM 136 tailored to the user's keystrokes (a sub-menu is displayed by the operation detection of the address key 108 and selection of a fade effect from the special effects is accomplished by a selection process using the cross key 106. Selection of the start frame assigned a fade effect and the decision of a fade effect assignment is according to operation detection of the decision key 107) (Step S26). Next, thumbnail image data is created at the frame time point (immediately upon conclusion) that a fade effect is completed (Step S28). This thumbnail image data is transferred and stored in the thumbnail image data storage area 1495 of the user memory 149 and the video file system management area 1497 is updated (Step S32).

FIG. 10 is a pattern diagram showing an example of a video to which a fade effect is assigned. The example in this drawing shows the image of a video lead frame gradually emerging from a white viewing surface. In the case of a video assigned such a fade effect, a thumbnail image is created at the frame time point (for example, the 4$^{th}$ frame on the far right side in FIG. 10) that a fade effect is completed. Accordingly, when a list display of thumbnail images is performed, the subject matter of each video can be easily identified.

Conversely, if the instruction operation which assigns a fade effect is not detected from the user, thumbnail image data is created from the lead frame of the saved video file (Step S30). This thumbnail image data is transferred and stored in the thumbnail image data storage area 1495 of the user memory 149 and the video file system management area 1497 is updated (Step S32).

B-2 Album Mode

Next, the process of a list display of saved video files will be explained.

First, when the album mode is selected by predetermined operation, the video file system management area 1497 of the user memory is referenced, the thumbnail image data storage area 1495 is searched (retrieved) (Step S40) and the thumbnail image data corresponding to a saved video files is acquired (Step S42). Next, the acquired thumbnail image data is expanded in the display buffer (Step S44) and, as shown in FIG. 11, a list display of the thumbnail images based on the thumbnail image data of each video file is presented on the main display 102 (Step S46).

Next, the operation judges whether or not one of the thumbnail images is selected by the user. Also, selection of a thumbnail image is performed by movement of the focus (selection) using the cross key 106. Then, when one of the thumbnail images is selected, the operation judges whether or not the playback time of the video file for a selected thumbnail image by its profile is longer than a predetermined playback time (for example, 30 seconds) (Step S50). When the playback time of the video file is shorter than a predetermined playback time, a normal playback will be performed in the display position of the thumbnail image during which the thumbnail image scale-size is reduced (Step S52). Next, the operation judges whether or not selection is to be continued (Step S54). When selection is continued (if focus is maintained), the operation judges whether or not playback of a video file is completed (Step S56). Then, if playback is not completed, playback is continued at Step S52.

The example in FIG. 12 illustrates playback of a video file in the situation where the thumbnail image 200 is selected. The example in FIG. 13 illustrates playback of a video file in the situation where thumbnail image 201 is selected. Referring now to the list display of the thumbnail images shown in FIG. 11, each of the thumbnail images 200 and 201 constitute the same image. If only these thumbnail images are viewed, naturally the difference in their contents cannot be determined. Thus, replaying the video file of the selected thumbnail image is necessary to ascertain the actual differences in the content of each video file.

On the other hand, when selection is discontinued during playback, the video file playback in the thumbnail image size will be concluded and the operation returns to Step 46 and reverts to a list display of the thumbnail images. Also, when playback of the video file is completed, the operation reverts to a list display of the thumbnail images.

Furthermore, when the playback time of the video file of a selected thumbnail image is longer than a predetermined playback time (for example, 30 seconds) as shown in FIG. 14, the playback time is segmented into a~p at intervals of 5 seconds (Step S58) and predetermined portions (a, e, i, m) are replayed in succession for each segment number of seconds (5 seconds in this case) (Step S60). Next, the operation judges whether or not selection is to be continued (Step S62). When selection is continued (if focus is maintained), the operation judges whether or not playback of a video file is completed (Step S64). Then, if playback is not completed, playback is continued at Step S60.

Conversely, when selection is discontinued during playback, the video file playback in the thumbnail image size will be concluded and the operation returns to Step 46 and reverts to a list display of the thumbnail images. Also, when playback of the video file is completed, the operation reverts to a list display of the thumbnail images.

C. Modified Example

Figure 15:
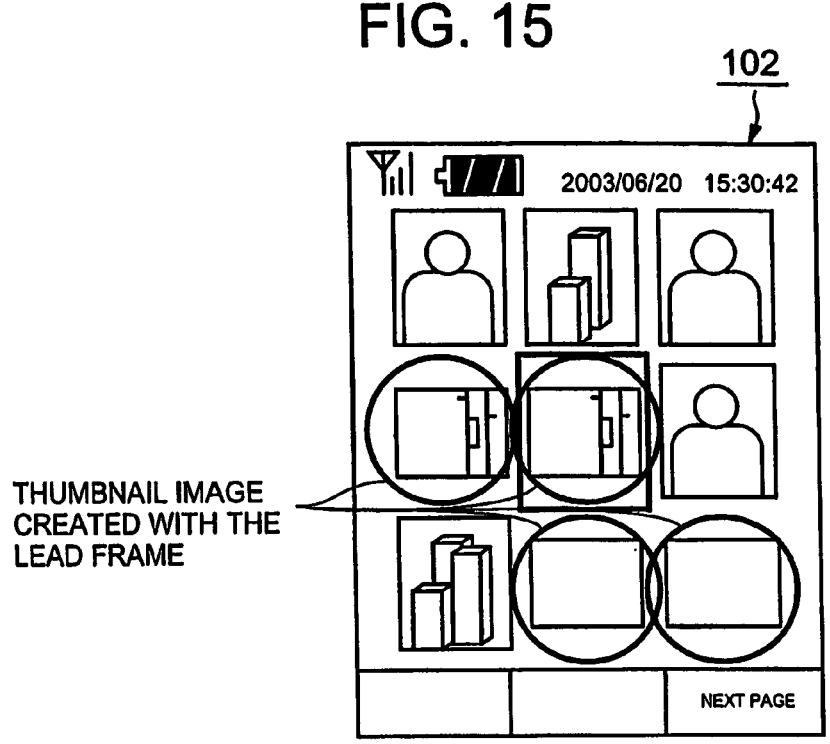
FIG. 15 is a pattern diagram showing a display example of the album mode according to a modified example of the present invention.
Figure 16:
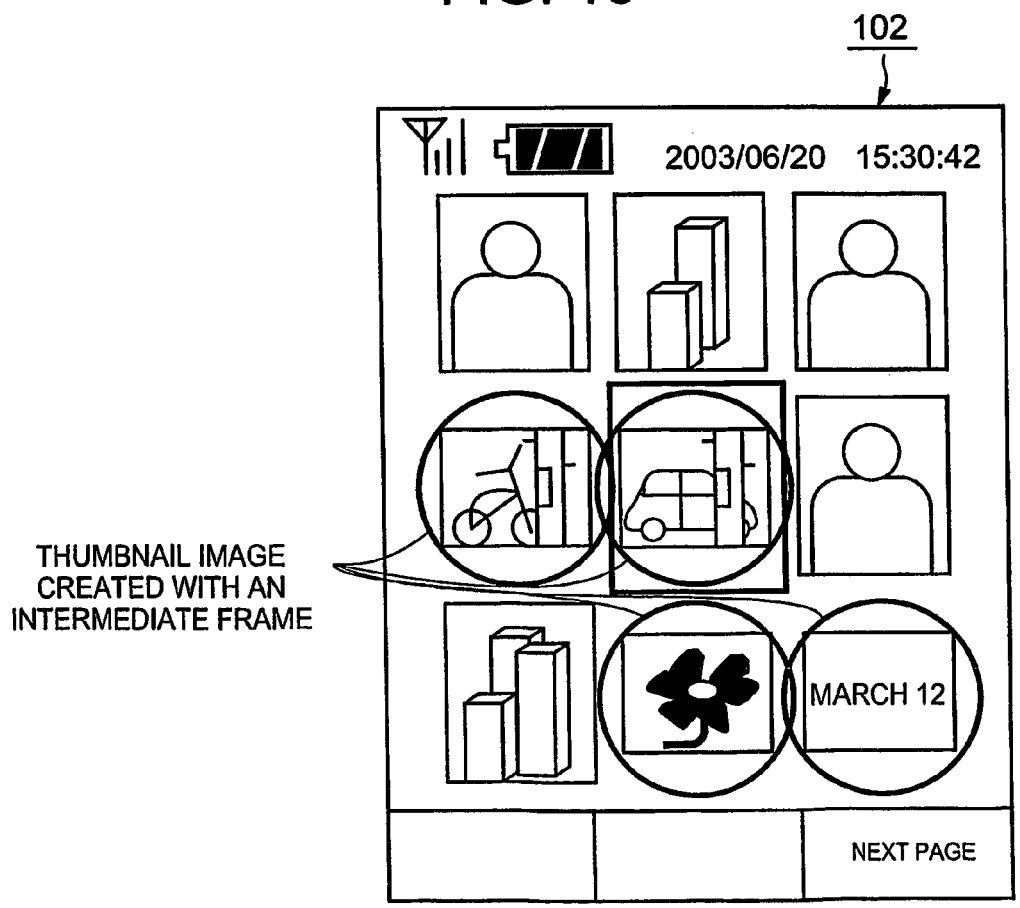
FIG. 16 is a pattern diagram showing a display example of the album mode according to a modified example of the present invention.

Next, a modified example of the present invention will be explained. Here, FIGS. 15 and 16 are pattern diagrams showing a display example of the album mode according to a modified example of the present invention. In the embodiment mentioned above, a thumbnail image is created using the frame time point (immediately upon conclusion) that a fade effect is completed both in relation to a video file and the lead frame which is assigned a fade effect as a special effect and in relation to a video file which is not assigned a fade effect as a special effect. As enclosed with a circle as shown in FIG. 15, regardless of the presence of a fade effect the lead frame of a video file is used and thumbnail data is created. However, as enclosed with a circuit as shown in FIG. 16, thumbnail image data may be created using an intermediate frame or final frame. Furthermore, it is also possible to create thumbnail image data using optional frames selected by the user.

Thus, based on the embodiment of simply selecting a thumbnail image corresponding to a video file, the video file is replayed and the contents can be readily identified. In particular, it is effective in cases where a thumbnail image is the same image. When creating thumbnail image data from a video file to which a fade effect is assigned and by using the frame time point that a fade effect is completed, the contents can be identified when a list display of the thumbnail images is performed. Also, on occasion when replaying a video file if the playback time is for a lengthy video file, the video playback time is segmented which makes it possible to replay just a few seconds to quickly identify its content.

Lastly, although the above describes a camera cellular phone wherein video recording is possible, the embodiments are also applicable also to composite equipment, such as a digital video camera in which video recording is possible, a digital video camera, Personal Digital Assistant (PDA), etc.

While the present invention has been described with reference to the preferred embodiments, it is intended that the invention be not limited by any of the details of the description therein but includes all the embodiments which fall within the scope of the appended claims.

The invention claimed is:

1. A video playback device comprising:
    video storage means for storing a plurality of videos;
    thumbnail image generation means for generating thumbnail images from the videos;
    thumbnail image storage means for storing the thumbnail images of the videos such that the thumbnail images and the corresponding videos from which the thumbnail images were generated are associated in plural sets;
    display means for performing a list display of the thumbnail images in the plural sets;
    selection means for selecting any one of the thumbnail images displayed by the display means;
    reduction means for reducing the size of the video corresponding to the selected thumbnail image to the size of the thumbnail image; and
    playback means for playing the reduced-size video in a display position of the selected thumbnail image.

2. The video playback device according to claim 1, wherein the thumbnail image storage means comprises:
    means for storing only thumbnail images generated by the thumbnail image generation means; and
    storage and management means for managing storage addresses of the thumbnail images and storage addresses of the corresponding videos in correspondence with each other.

3. The video playback device according to claim 2, wherein the storage and management means stores playback time durations of the videos in correspondence with the storage addresses of the videos.

4. The video playback device according to claim 3, further comprising means for judging whether or not the playback time of the video corresponding to the selected thumbnail image is longer than a predetermined time;
    wherein the reduction means reduces the size of the video corresponding to the selected thumbnail image when the playback time of the video corresponding to the selected thumbnail image is judged to be not longer than the predetermined time.

5. The video playback device according to claim 2, wherein the storage and management means stores acquisition sources of the videos in correspondence with the storage addresses of the videos.

6. The video playback device according to claim 1, further comprising:
    assignment means for assigning a special effect to selected frames of a video stored in the video storage means, wherein the thumbnail image generation means generates the thumbnail image of said video from a frame to which the special effect is not assigned by the assignment means.

7. The video playback device according to claim 1, wherein the thumbnail image generation means generates a thumbnail image from any of a lead frame, an intermediate frame, or a final frame of a video stored in the video storage means.

8. The video playback device according to claim 1, further comprising:
    imaging means for imaging a video;
    wherein the video storage means stores the video imaged by the imaging means.

9. The video playback device according to claim 1, further comprising:
    wireless communication means for performing wireless communication;
    wherein the video storage means stores a video received via the wireless communication means.

10. The video playback device according to claim 1, further comprising:
    input means for acquiring a video from an external source;
    wherein the video storage means stores the video inputted via the input means.

11. The video playback device according to claim 1, wherein the video storage means stores a video acquired via a broadcasting medium.

12. A video playback method comprising:
    generating thumbnail images from a plurality of videos;
    storing the thumbnail images of the videos such that the thumbnail images and the corresponding videos from which the thumbnail images were generated are associated in plural sets;
    performing a list display of the thumbnail images in the plural sets;
    selecting any one of the displayed thumbnail images;
    reducing the size of the video corresponding to the selected thumbnail image to the size of the thumbnail image; and
    playing the reduced-size video in a display position of the selected thumbnail image.

13. A computer-readable storage medium having a video playback program stored thereon that is executable by a computer to perform a process comprising:

generating thumbnail images from a plurality of videos;

storing the thumbnail images of the videos such that the thumbnail images and the corresponding videos from which the thumbnail images were generated are associated in plural sets;

performing a list display of the thumbnail images in the plural sets;

selecting any one of the displayed thumbnail images;

reducing the size of the video corresponding to the selected thumbnail image to the size of the thumbnail image; and playing the reduced-size video in a display position of the selected thumbnail image.

* * * * *